(12) United States Patent
Barros et al.

(10) Patent No.: US 12,248,843 B2
(45) Date of Patent: Mar. 11, 2025

(54) QUICK RESPONSE CODES

(71) Applicant: GOOGLE LLC, Mountain View, CA (US)

(72) Inventors: Brett Barros, San Mateo, CA (US); Alexander James Faaborg, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/247,495

(22) PCT Filed: Oct. 7, 2020

(86) PCT No.: PCT/US2020/070628
§ 371 (c)(1),
(2) Date: Mar. 31, 2023

(87) PCT Pub. No.: WO2022/076017
PCT Pub. Date: Apr. 14, 2022

(65) Prior Publication Data
US 2023/0376711 A1    Nov. 23, 2023

(51) Int. Cl.
*G06K 7/14*    (2006.01)
*G06K 19/06*    (2006.01)

(52) U.S. Cl.
CPC ......... *G06K 7/1408* (2013.01); *G06K 7/1439* (2013.01); *G06K 19/06037* (2013.01)

(58) Field of Classification Search
CPC ............... G06K 7/1408; G06K 7/1439; G06K 19/06037
See application file for complete search history.

(56) References Cited

U.S. PATENT DOCUMENTS

| 10,062,023 B2 * | 8/2018 | Nishizaki ......... G06K 19/06037 |
| 10,410,028 B1 | 9/2019 | Cansizoglu et al. |
| 2006/0118631 A1 * | 6/2006 | Lubow ............. G06K 19/06037 235/462.01 |

(Continued)

FOREIGN PATENT DOCUMENTS

EP    3425554 A1    1/2019

OTHER PUBLICATIONS

International Search Report and Written Opinion for PCT Application No. PCT/US2020/070628, mailed on Jun. 29, 2021, 11 pages.

*Primary Examiner* — Tuyen K Vo
(74) *Attorney, Agent, or Firm* — Brake Hughes Bellermann LLP

(57) ABSTRACT

Systems and techniques include using a sensor of a computing device to detect the presence of a first portion of a code, the code including at least the first portion and a second portion, where the first portion of the code is decodable and includes an identifier and the second portion of the code is non-decodable. The computing device recognizes the identifier in the first portion of the code and obtains instructions for decoding the second portion of the code using the identifier and/or data associated with the identifier. The instructions to decode the second portion of the code are processed to generate a decoded second portion of the code. The computing device performs an action defined in the decoded second portion of the code.

29 Claims, 6 Drawing Sheets

(56) References Cited

U.S. PATENT DOCUMENTS

| | | | |
|---|---|---|---|
| 2007/0152056 A1* | 7/2007 | Tuschel | G06K 15/00 |
| | | | 235/375 |
| 2007/0221732 A1* | 9/2007 | Tuschel | G06K 19/10 |
| | | | 235/462.01 |
| 2013/0162676 A1 | 6/2013 | Taylor | |
| 2013/0278622 A1 | 10/2013 | Sun et al. | |
| 2016/0247054 A1 | 8/2016 | Sakahashi et al. | |
| 2017/0069135 A1* | 3/2017 | Komaki | G06V 20/20 |
| 2018/0025263 A1 | 1/2018 | Toyoizumi et al. | |
| 2018/0232544 A1 | 8/2018 | Catalano et al. | |
| 2019/0101984 A1* | 4/2019 | Talati | G06N 20/00 |
| 2019/0205588 A1* | 7/2019 | Ito | G06K 19/06056 |
| 2021/0110367 A1* | 4/2021 | Sanders | G07G 1/009 |

* cited by examiner

QUICK RESPONSE CODES

CROSS REFERENCE TO RELATED APPLICATION

This application is a 35 U.S.C. § 371 National Phase Entry Application from PCT/US2020/070628, filed Oct. 7, 2020, designating the U.S., the disclosure of which is incorporated herein by reference in its entirety.

TECHNICAL FIELD

This description relates to quick response codes.

BACKGROUND

In general, a conventional quick response (QR) code is a two-dimensional visual code that is able to store a wide variety of information within the code and to convey the information almost instantly using a QR code reader, such as an integrated QR code reader in a camera on a phone. The QR code includes a structure that can represent various characters, including number, letters, Kanji, Kana, symbol binaries, and control codes. The characters can represent words and phrases such as Internet addresses. Generally, QR codes can be universally read and decoded by a QR code reader.

In some cases, proprietary branded codes are being used to convey information in a manner similar to conventional QR codes; however, unlike conventional QR codes, the proprietary branded codes may not be universally read and decoded by a code reader on a computing device.

SUMMARY

According to one general aspect, a computer-implemented method includes detecting, using a sensor of a computing device, presence of a first portion of a code, the code including at least the first portion and a second portion, where the first portion of the code is decodable and includes an identifier and the second portion of the code is non-decodable. The computer-implemented method includes recognizing, by the computing device, the identifier in the first portion of the code. The computer-implemented method includes obtaining instructions for decoding the second portion of the code using the identifier and/or data associated with the identifier and processing the instructions to decode the second portion of the code to generate a decoded second portion of the code. The computer-implemented method includes performing, by the computing device, an action defined in the decoded second portion of the code.

Implementations may include one or more of the following features. For example, in some implementations, the code may be a two-dimensional (2D) image with the first portion of the code defining an outer portion of the 2D image and the second portion of the code defining an inner portion of the 2D image.

In some implementations the code may be a 2D image with the first portion of the code defining an inner portion of the 2D image and the second portion of the code defining an outer portion of the 2D image.

In some implementations, the code includes graphical characteristics differing in position, size, color, shape and/or fill.

In some implementations, the first portion of the code is universally decodable, in particular without the instructions to decode the second portion of the code and the second portion of the code is only decodable with the instructions.

In some implementations, the detecting, using the sensor of the computing device, the presence of the first portion of the code includes detecting, using a camera of a wearable computing device, the presence of the first portion of the code. The wearable computing device may include smart eyewear.

In some implementations, recognizing, by the computing device, the identifier in the first portion of the code includes recognizing, using a machine learning module on the computing device, the identifier in the first portion of the code.

In some implementations, obtaining the instructions for decoding the second portion of the code using the identifier includes transmitting the identifier to a remote computing device identified by the identifier over a network and receiving the instructions from the remote computing device over the network based on the identifier.

In some implementations, obtaining the instructions for decoding the second portion of the code using the identifier includes retrieving the instructions from a memory on the computing device.

In some implementations, obtaining the instructions for decoding the second portion of the code using the identifier includes transmitting the identifier to a first remote computing device identified by the identifier over a network and processing the instructions to decode the second portion of the code includes receiving the decoded second portion of the code from a second remote computing device, the second remote computing device different than the first remote computing device.

In another general aspect, a computer program product tangibly embodied in a non-transitory storage medium includes instructions that when executed by a processor cause the processor to perform operations. The operations include detecting, using a sensor of a computing device, presence of a first portion of a code, the code including at least the first portion and a second portion, where the first portion of the code is decodable and includes an identifier and the second portion of the code is non-decodable. The operations include recognizing, by the computing device, the identifier in the first portion of the code and obtaining instructions for decoding the second portion of the code using the identifier and/or data associated with the identifier. The operations include processing the instructions to decode the second portion of the code to generate a decoded second portion of the code and performing, by the computing device, an action defined in the decoded second portion of the code.

Implementations may include one or more of the following features. For example, the code may be a two-dimensional (2D) image with the first portion of the code defining an outer portion of the 2D image and the second portion of the code defining an inner portion of the 2D image.

In some implementations, the code may be a 2D image with the first portion of the code defining an inner portion of the 2D image and the second portion of the code defining an outer portion of the 2D image.

In some implementations, the code includes graphical characteristics differing in position, size, color, shape and/or fill.

In some implementations, the first portion of the code is universally decodable, in particular without the instructions to decode the second portion of the code and the second portion of the code is only decodable with the instructions.

In some implementations, the detecting, using the sensor of the computing device, the presence of the first portion of the code includes detecting the presence of the first portion of the code using a camera of a wearable computing device. The wearable computing device may include smart eyewear.

In some implementations, recognizing, by the computing device, the identifier in the first portion of the code includes recognizing, using a machine learning module on the computing device, the identifier in the first portion of the code.

In some implementations, obtaining the instructions for decoding the second portion of the code using the identifier includes transmitting the identifier to a remote computing device identified by the identifier over a network and receiving the instructions from the remote computing device over the network based on the identifier.

In some implementations, obtaining the instructions for decoding the second portion of the code using the identifier includes retrieving the instructions from a memory on the computing device.

In some implementations, obtaining the instructions for decoding the second portion of the code using the identifier includes transmitting the identifier to a first remote computing device identified by the identifier over a network and processing the instructions to decode the second portion of the code includes receiving the decoded second portion of the code from a second remote computing device, the second remote computing device different than the first remote computing device.

In another general aspect, a computing device includes a sensor, a non-transitory computer readable storage medium comprising instructions, and at least one processor that is operably coupled to the non-transitory computer-readable storage medium and that is arranged and configured to execute the instructions that, when executed, cause the at least one processor to implement an application. The application includes a detector that is configured to use the sensor to detect presence of a first portion of a code, the code including at least the first portion and a second portion, where the first portion of the code is decodable and includes an identifier and the second portion of the code is non-decodable. The application includes a recognizer that is configured to recognize the identifier in the first portion of the code, obtain instructions for decoding the second portion of the code using the identifier and/or data associated with the identifier, and process the instructions to decode the second portion of the code to generate a decoded second portion of the code, where the at least one processor performs an action defined in the decoded second portion of the code.

Implementations may include one or more of the following features. For example, the code may be a two-dimensional (2D) image with the first portion of the code defining an outer portion of the 2D image and the second portion of the code defining an inner portion of the 2D image.

In some implementations, the code may be a 2D image with the first portion of the code defining an inner portion of the 2D image and the second portion of the code defining an outer portion of the 2D image.

In some implementations, the code may include graphical characteristics differing in position, size, color, shape and/or fill.

In some implementations, the first portion of the code is universally decodable, in particular without the instructions to decode the second portion of the code and the second portion of the code is only decodable with the instructions.

In some implementations, the computing device is a wearable computing device, the senor includes a camera, and the detector is configured to use the camera to detect the presence of the first portion of the code. The wearable computing device may include smart eyewear.

In some implementations, the recognizer includes a machine learning module that is configured to recognize the identifier in the first portion of the code.

In some implementations, the recognizer is configured to obtain the instructions for decoding the second portion of the code using the identifier by transmitting the identifier to a remote computing device identified by the identifier over a network and receiving the instructions from the remote computing device over the network based on the identifier.

In some implementations, the recognizer is configured to obtain the instructions for decoding the second portion of the code using the identifier by retrieving the instructions from the non-transitory computer-readable storage medium.

The details of one or more implementations are set forth in the accompanying drawings and the description below. Other features will be apparent from the description and drawings, and from the claims.

DETAILED DESCRIPTION

Figure 1A:
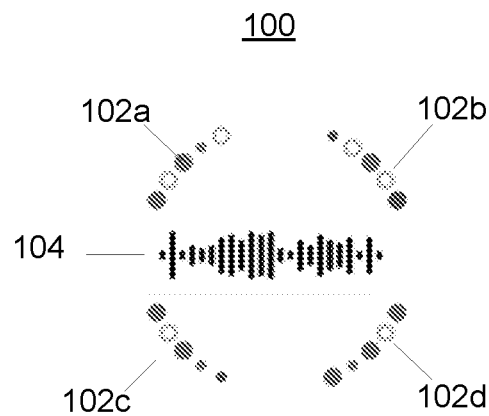
FIGS. 1A-1F are sketches of example codes and/or code portions.

This document describes a code that includes a decodable portion of the code that includes an identifier. The identifier points to a source, where the decoder provides instructions on how to decode the rest of the code. This document also describes systems and techniques for resolving the code by a computing device so the computing device can perform an action defined in the code.

The code and the corresponding systems and techniques related to resolving the code provide a technical solution to the technical problems encountered by proprietary branded codes, where the codes may not be universally read and decoded by a code reader on a computing device. Specifically, the code and the corresponding systems and techniques related to resolving the code provide a technical solution to this and other technical problems by providing a decodable portion of the code that is capable of being universally decodable. The decodable portion includes an identifier that points to a source that provides instructions on how to decode the rest of the code. The rest of the code may be branded and proprietary and may not be universally decodable by a code reader on a computing device, but can be decoded using the identifier and the instructions provided by a source.

In this manner, the code is a new type of quick response code because the code is universally recognizable by any code reader on a computing device using the decodable portion and, at the same time, the code enables proprietary branding and coding in the rest of the code. Thus, the code and the corresponding systems and techniques are an improvement over prior codes and the corresponding encoding and decoding systems and techniques.

Additionally, the code is flexible as to the design and location of the decodable portion in relation to the rest of the code. For example, in some implementations, the code may be a two dimensional (2D) image having any type of shape. An outer portion of the 2D image may define the decodable portion of the code and an inner portion of the 2D image may define the rest of the code, which may be proprietary and branded. In some implementations, for instance, the code may be a 2D image having any type of shape. The inner portion of the 2D image may define the decodable portion of the code and the outer portion of the 2D image may define the rest of the code, which may be proprietary and branded. Still, in some implementations, the code may be a 2D image of any shape and size with a first portion of the 2D image defining the decodable portion of the code and a second portion of the 2D image defining the rest of the code or the non-decodable portion of the code.

The techniques for resolving the code, which are discussed in more detail below, include detecting a presence of the decodable portion of the code using a sensor of a computing device. A low power sensor may be used to detect the presence of the decodable portion. In this manner, the sensor used to detect the presence of the decodable portion may be on and using minimal power, while other components of the computing device are in an off state or lower power state.

In some implementations, as mentioned briefly above, the decodable portion of the code includes an identifier. After detecting the presence of the decodable portion of the code, the techniques include recognizing the identifier in the decodable portion of the code. In some implementations, the computing device being used to resolve the code may use a machine learning module to recognize the identifier in the decodable portion of the code. The machine learning module may be trained using one or more machine learning techniques to recognize the identifier.

In some implementations, the decodable portion functions as a detectable signal to analyse the region, and then the computing device being used to resolve the code may use a machine learning module to propose results for the non-decodable portion of the code. The machine learning module may be trained using one or more machine learning training techniques to recognize the non-decodable portion of the code. The detectable portion of the code can then serve as a gatekeeper to the use of resources by machine learning, and minimize false positives by preventing code recognitions predictions on unrelated worldly images. In these implementations, the decodable portion may not include an identifier and, as discussed above, be used as a detectable signal that, once detected, triggers or causes an application, which may include a machine learning module, to recognize and propose predictions for the non-decodable portion of the code.

When a decodable portion of the code has an identifier, part of the recognition process is to determine where the identifier points to so that the computing device may obtain instructions for decoding the non-decodable portion of the code. In some implementations, the identifier may direct the computing device to obtain instructions from a remote server. For example, the identifier may point to an application repository (e.g., an app store) and refer to a specific application developer identifier and a manifest file for the application developer, which contains instructions for decoding the rest of the code. In some implementations, the identifier may direct the computing device to obtain instructions locally from a memory on the computing device.

Once the instructions are obtained in some manner, the instructions are processed to decode the rest of the code. In some implementations, the instructions are processed to decode the rest of the code on the computing device that detected the code. In some implementations, the instructions are processed on a remote computing device, which may be the remote computing device that stored the instructions or may be a different remote computing device that obtained the instructions from the remote computing device that stored the instructions.

The techniques include performing an action defined in the portion of the code decoded using the instructions. For example, in some implementations, the action is an action performed by the computing device. The action can be any type of action including, for instance, playing a song, controlling Internet of things (IoT) devices, navigating a browser to a web site, launching an installed application, launching the application store application, or any action defined in the part of the code, as interpreted by the instructions. The actions that may be performed are varying and unlimited. In this manner, one part of the code is universally recognizable and decodable and the other part of the code, in some implementations, is proprietary and branded and controlled by instructions that define how to interpret and unlock the action in this part of the code. Additional details and examples are provided below with respect to the figures.

Examples herein refer to computer systems. As used herein, a computer system includes, without limitation, any suitable combination of one or more devices configured with hardware, firmware, and software to carry out one or more of the computerized techniques described herein. A computer system as used herein may be a single computing device or multiple computing devices working collectively and in which the storage of data and the execution of functions are spread out amongst the various computing devices.

Examples herein refer to augmented reality (AR). As used herein, AR refers to a user experience in which a computing device facilitates a sensory perception that includes at least one virtual aspect and at least one aspect of reality. AR can be provided by any of multiple types of computing devices, including, but not limited to, a wearable device. As used herein, an AR headset refers to any computing device that facilitates AR. An AR headset can include, but is not limited to, smart eyewear or smart glasses or AR glasses, another wearable AR device, a tablet, a phone, or a laptop computer. In some types of AR, the user can perceive the aspect of reality directly with his or her senses without intermediation by the computing device. For example, some AR headsets are designed to beam an image (e.g., the virtual aspect to be perceived) to the user's retina while also allowing the eye to register other light that was not generated by the AR headset. In other types of AR, a computing device can improve, complement, alter, and/or enable the user's impression of reality (e.g., the real aspect to be perceived) in one or more ways. In some implementations, AR is perceived on a screen of a computing device's display device. For example, some AR headsets are designed with camera feedthrough to present a camera image of the user's surrounding environment on a display device positioned in front of the user's eye. The display device may be an in-lens micro display, a display projected on a lens surface, a display projected on a plane of a lens-less frame, or other type of display.

Examples herein refer to a computing device. As used herein, a computing device includes, without limitation, a server, a desktop computer, a laptop computer, a mobile computing device, a tablet device, a phone device (a smart phone device), a wearable computing device, a watch device, as well as other types of computing devices. Typically, the computing device includes at least one memory and at least one processor. The computing devices also may include a display device.

Examples herein refer to a wearable computing device. As used herein, a wearable computing device includes, without limitation, a watch device (a smart watch device), a ring device, an AR headset, smart eyewear (smart glasses), as well as other types of wearable computing devices. Typically, the wearable computing device includes at least one memory and at least one processor. The wearable computing devices also may include a display device.

Examples herein refer to a code. As used herein, a code includes, without limitation, a visual symbol or visual image that is encoded to represent various characters including numbers, letters, Kanji, Kana, symbols, symbol binaries, and control codes. The code includes a two-dimensional (2D) image of any shape or size. The code includes at least a first portion and at least a second portion. In some implementations, the first portion is decodable and includes an identifier. In some implementations, the first portion is decodable and does not include an identifier. The characters in the first portion may be capable of representing numerous (e.g., thousands, millions, or billions) of unique identifiers. In some implementations, the second portion is non-decodable, meaning that additional instructions stored elsewhere define how to decode the second portion. That is, a code reader may be able to decode or read the first portion, but may not be able to decode or not read the second portion of the code without the use of additional instructions. In this manner, the first portion of the code is said to be universally recognizable meaning that the first portion of the code can be read or decoded by any code reader. The rest of the code, including the second portion of the code, may include branded information, proprietary information, or other information that is decodable with the use of additional instructions provided from a different source other than the code itself. In some implementations, the second portion is recognizable by using machine learning/computer vision techniques that are triggered by detection of the first portion without use of an identifier. The code may include structural features such as, for example, positioning detection markers, alignment markers, timing pattern, version information, format information, data and error correction keys, a quiet zone, as well as other features.

FIGS. 1A-1F illustrate example sketches of example codes and/or code portions. FIG. 1A illustrates an example code 100. The code 100 is a 2D image having a circular type shape or pattern. The code 100 includes a first portion 102a-d and a second portion 104 with the first portion 102a-d defining an outer portion of the 2D image and the second portion 104 defining an inner portion of the 2D image.

The first portion 102a-d includes an outer ring of dots or circles having various characteristics, e.g. graphical characteristics, such as position, shape, size, fill, and/or color. In this example, the first portion 102a-d has four segments that define the outer portion or outer ring. The pattern of dots and the variation of the dots in size, color, and fill represent an identifier, which also may be referred to as an ID. The first portion 102a-d is detectable and recognizable by a sensor on a computing device. That is, the first portion 102a-d is decodable or readable by a code reader on a computing device to recognize the identifier. In this manner, the first portion 102a-d is intended to be universally detectable and recognizable. The identifier points to a source for obtaining instructions on how to decode the second portion 104 of the code. Once the identifier is recognized, a computing device goes to the source identified by the identifier to obtain instructions for how to decode the rest of the code such as the second portion 104 of the code.

In some implementations, the source may be a local source such as a memory on the computing device that detected and recognized the first portion 102a-d. For example, the identifier may point to a local cache on a memory device that stores the instructions for decoding or interpreting the second portion 104.

In some implementations, the source may be a remote source such as a remote computing device that is accessed using a network. For example, the identifier may include an Internet address that points to a remote computing device connected to the Internet, where the remote computing device stores the instructions for decoding or interpreting the second portion 104. In another example, the identifier may be an application developer identifier that corresponds to a particular application developer in an application store. The application developer identifier may include a file such as, for example, a manifest file that includes instructions for decoding or interpreting the second portion 104.

The second portion 104 of the code may include images, characters, symbols, text, words, phrases, photos, or anything including coded and non-coded items. The second portion 104 may encode and define at least one action that is to be performed by the computing device that scanned the code 100. In this example, the second portion 104 includes a pattern of vertical lines of varying lengths. The second portion 104 in this example is decoded using the instructions obtained from the source identified by the identifier in the first portion 102a-d. The obtained or received instructions enable the second portion 104 to be decoded so that any action defined by the second portion 104 may be performed.

While the example of FIG. 1A illustrates the first portion 102a-d as an outer portion of the code and the second portion 104 as an inner portion of the code, other example codes may include the first portion an inner portion of the code and the second portion as the outer portion of the code, as discussed below with respect to FIG. 1E.

Figure 1B:
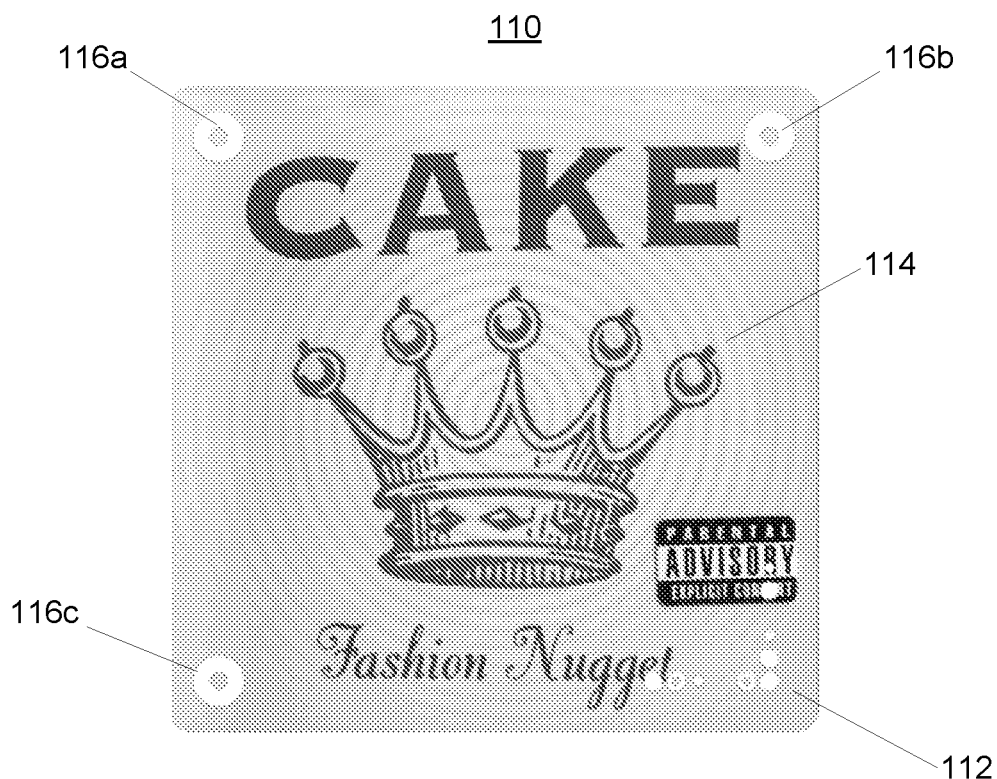

FIG. 1B illustrates another example code 110. In this example, the code 110 includes a first portion 112 and a second portion 114. Additionally, the code 110 includes position detection markers 116a-116c, which allow a code reader or scanner to accurately detect the code 110 and read it at high speed, while indicating the direction in which the code 110 is printed.

The code 110 is a 2D image having a square type shape or pattern. The first portion 112 is located in a bottom corner of the image and the second portion 114 is located in an interior of the square. In some implementations, the first portion 112 may be superimposed or overlay a part of the second portion 114. The first portion 112 includes a series of dots or circles, which may vary in size, color, and fill, and represent an identifier, which also may be referred to as an ID. The first portion 112 is detectable and recognizable by a sensor on a computing device. That is, the first portion 112 is decodable or readable by a code reader on a computing device to recognize the identifier. In this manner, the first portion 112 is intended to be universally detectable and recognizable. The identifier points to a source for obtaining instructions on how to decode the second portion 114 of the code. Once the identifier is recognized, a computing device goes to the source identified by the identifier to obtain instructions for how to decode the rest of the code such as the second portion 114 of the code.

In this example, the second portion 114 includes text, symbols, patterns, and color. The second portion 114 in this example is decoded using the instructions obtained from the source identified by the identifier in the first portion 112. The obtained or received instructions enable the second portion 114 to be decoded so that any action defined by the second portion 114 may be performed.

Figure 1C:
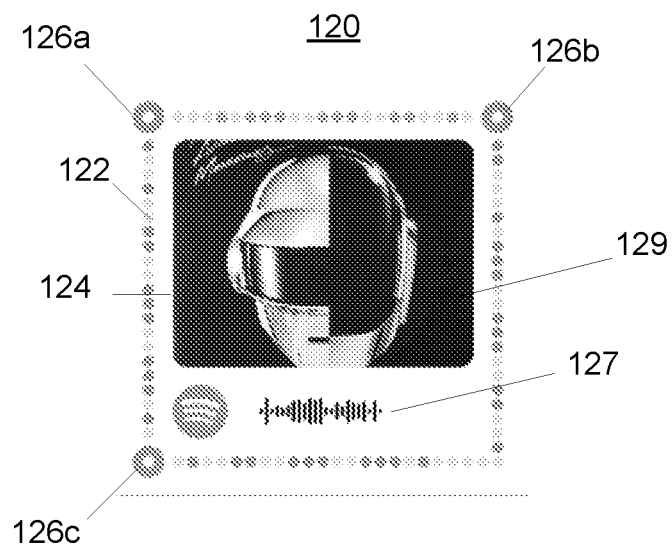

FIG. 1C illustrates another example code 120. In this example, the code 120 includes a first portion 122 and a second portion 124. Additionally, the code 120 includes position detection markers 126a-126c, which allow a code reader or scanner to accurately detect the code 110 and read it at high speed, while indicating the direction in which the code 110 is printed.

The code 120 is a 2D image having a square type shape or pattern. The first portion 122 is located on an outer portion of the image around a perimeter of the image. The second portion 124 includes the rest of the image and is located on an interior of the image. The first portion 122 includes a series of dots or circles, which may vary in size, color, and fill, and represent an identifier, which also may be referred to as an ID. The first portion 122 is detectable and recognizable by a sensor on a computing device. That is, the first portion 122 is decodable or readable by a code reader on a computing device to recognize the identifier. In this manner, the first portion 122 is intended to be universally detectable and recognizable. The identifier points to a source for obtaining instructions on how to decode the second portion 124 of the code. Once the identifier is recognized, a computing device goes to the source identified by the identifier to obtain instructions for how to decode the rest of the code such as the second portion 124 of the code.

In this example, the second portion 114 includes both a coded portion 127 and a non-coded portion 129. The coded portion 127 includes a series of vertical lines in varying length. The coded portion 127 also may include the interior circle having three lines within the circle. The coded portion 127 is decoded using the instructions obtained from the source identified by the identifier in the first portion 122. The obtained or received instructions enable the coded portion 127 to be decoded so that any action defined by the coded portion 127 may be performed. The non-coded portion 129 may be anything, including non-coded branding.

Figure 1D:

FIG. 1D illustrates another example code 130. In this example, the code 130 includes a first portion 132 and a second portion 134.

The code 130 includes the first portion 132 followed linearly by the second portion 134, which is a text string as additional information. That is, the first portion 132 precedes the second portion 134. The first portion 132 includes a series of dots or circles, which may vary in size, color, and fill, and represent an identifier, which also may be referred to as an ID. The first portion 132 is arranged in an arc-shape. The first portion 132 is detectable and recognizable by a sensor on a computing device. That is, the first portion 132 is decodable or readable by a code reader on a computing device to recognize the identifier. In this manner, the first portion 132 is intended to be universally detectable and recognizable. The identifier points to a source for obtaining instructions on how to decode the second portion 134 of the code. Once the identifier is recognized, a computing device goes to the source identified by the identifier to obtain instructions for how to decode the rest of the code such as the second portion 134 of the code.

In this example, the second portion 134 includes the text "G Next Home". In some implementations, the second portion 134 may include further routing information for sending the identifier from the first portion 132 to a source to obtain instructions for performing an action. That is, the obtained instructions may not be used to decode the second portion 134 but instead may themselves define an action to be taken. In some implementations, the second portion 134 may be decoded using the instructions obtained from the source identified by the identifier in the first portion 132. The obtained or received instructions enable the second portion 134 to be decoded so that any action defined by the second portion 134 may be performed.

Figure 1E:
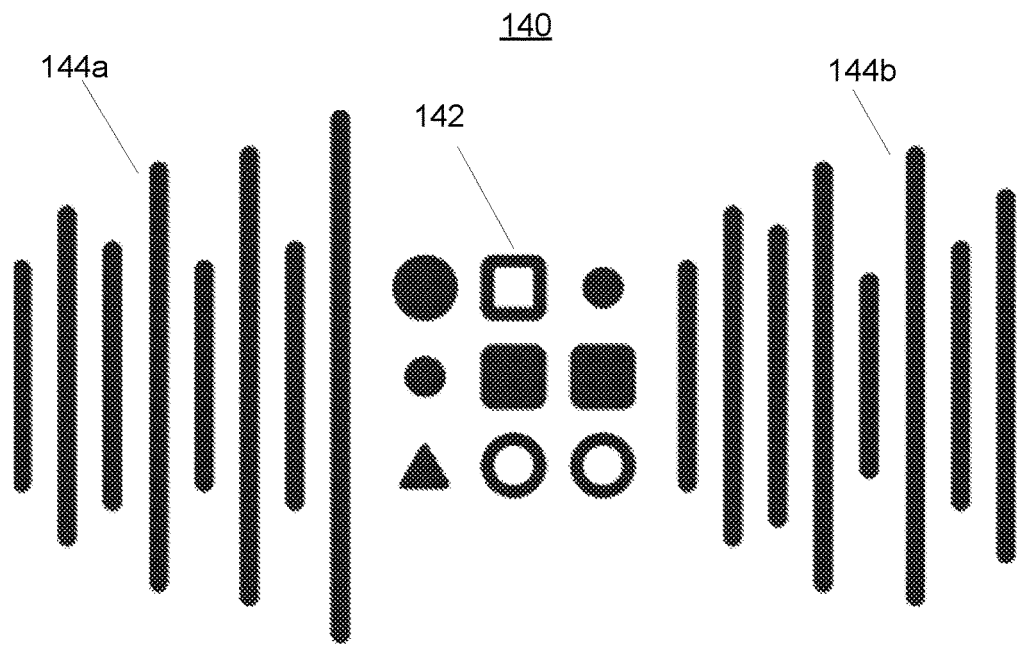

FIG. 1E illustrates an example code 140. The code 140 is a 2D image arranged in a linear type of pattern. The code 140 includes a first portion 142 and a second portion 144a-b with the first portion 142 defining an inner portion of the 2D image and the second portion 144a-b defining an outer portion of the 2D image.

The first portion 142 includes a 3×3 grid of shapes having various characteristics, e.g. graphical characteristics, such as position, shape, size, fill, and/or color. The 3×3 grid pattern of shapes and the variation of the dots in shape, size, color, and fill represent an identifier, which also may be referred to as an ID. The first portion 142 is detectable and recognizable by a sensor on a computing device. That is, the first portion 142 is decodable or readable by a code reader on a computing device to recognize the identifier. In this manner, the first portion 142 is intended to be universally detectable and recognizable. The identifier points to a source for obtaining instructions on how to decode the second portion 144a-b of the code. Once the identifier is recognized, a computing device goes to the source identified by the identifier to obtain instructions for how to decode the rest of the code such as the second portion 144a-b of the code.

In some implementations, the source may be a local source such as a memory on the computing device that detected and recognized the first portion 142. For example, the identifier may point to a local cache on a memory device that stores the instructions for decoding or interpreting the second portion 144a-b.

In some implementations, the source may be a remote source such as a remote computing device that is accessed using a network. For example, the identifier may include an Internet address that points to a remote computing device connected to the Internet, where the remote computing device stores the instructions for decoding or interpreting the second portion 144a-b. In another example, the identifier may be an application developer identifier that corresponds to a particular application developer in an application store. The application developer identifier may include a file such as, for example, a manifest file that includes instructions for decoding or interpreting the second portion 104.

The second portion 144a-b of the code may include images, characters, symbols, text, words, phrases, photos, or anything including coded and non-coded items. The second portion 144a-b may encode and define at least one action that is to be performed by the computing device that scanned the code 140. In this example, the second portion 144a-b includes two patterns of vertical lines of varying lengths. The second portion 144a-b in this example is decoded using the instructions obtained from the source identified by the identifier in the first portion 142. The obtained or received instructions enable the second portion 144a-b to be decoded so that any action defined by the second portion 144a-b may be performed.

Figure 1F:
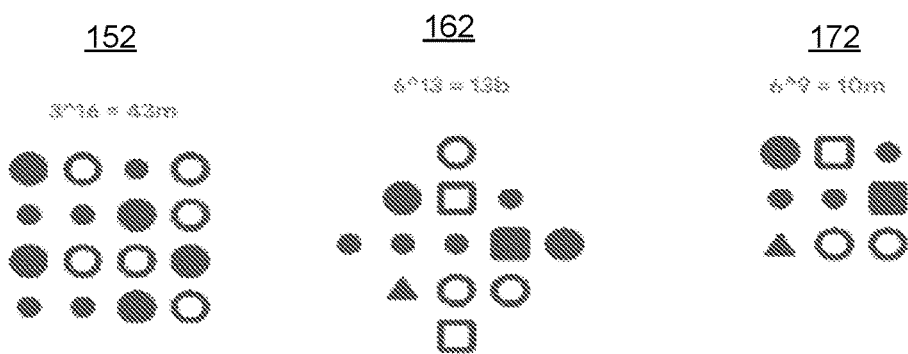

FIG. 1F illustrates three examples of first portions of a code. As discussed in detail above, the first portion of the code is detectable and recognizable and may encode an identifier, which points to a source to obtain instructions for decoding at least a second portion of the code. In all three examples, the first portion may be represented by different shapes having varying size, color, and/or fill. These first portions may be matched with any second portion of a code to form a code, where the first portion and the second portion function in the same manner as described above.

The first portion 152 includes a 4×4 grid pattern of circles having varying sizes and fill. Each position in the grid can include one of three possibilities—large filled circle, small filled circle, or large unfilled circle. With this pattern, there are 3¹⁶ possible combinations, which equates to approximately 43 million different combinations. In this manner, this 4×4 grid with three different possibilities in each position enables 43 million different unique identifiers to be encoded.

The first portion 162 includes an approximate square shape having 13 positions with 6 possible variants in each position. The symbols in the grid can have varying shapes, sizes, fill, and color. With this pattern, there are 6¹³ possible combinations, which equates to approximately 13 billion different combinations. In this manner, this first portion 162 with six different possibilities in each position enables 13 billion different unique identifiers to be encoded.

The first portion 172 includes a 3×3 grid pattern of symbols having varying shapes, sizes and fill. Each of the 9 positions in the grid can include one of six variants. With this pattern, there are 6⁹ possible combinations, which equates to approximately 10 million different combinations. In this manner, this 3×3 grid with six different possibilities in each position enables 10 million different unique identifiers to be encoded.

Figure 2:
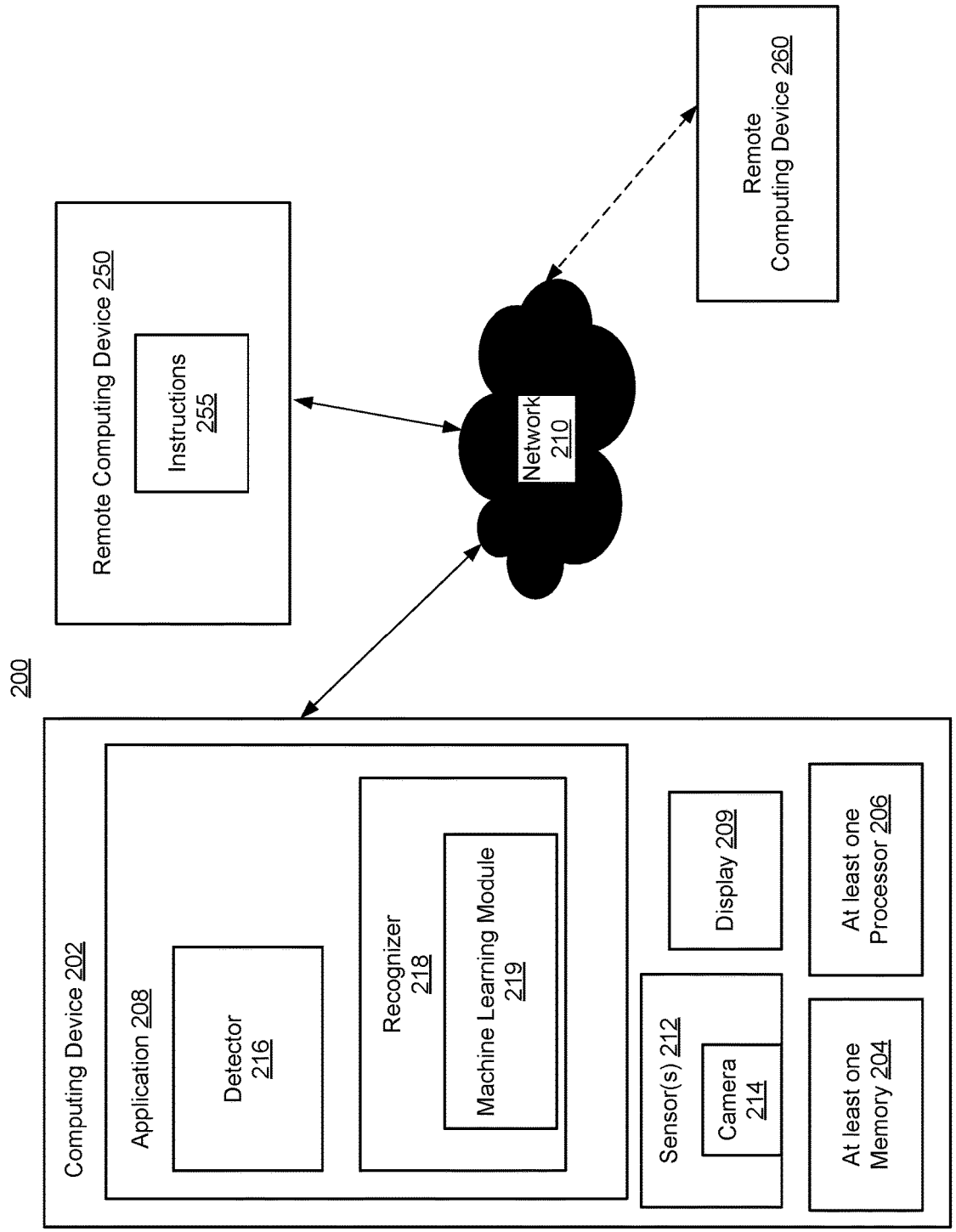
FIG. 2 is a block diagram of an example system for detecting and recognizing the codes of FIGS. 1A-1F.

FIG. 2 illustrates an example block diagram of a system 200 for detecting and recognizing codes such as the example codes and code portions illustrated in FIGS. 1A-1F. The system 200 includes a computing device 202 having at least one memory 204, at least one processor 206 and at least one application 208. The computing device 202 may communicate with one or more other computing devices over a network 210. For instance, the computing device 202 may communicate with remote computing device 250 and remote computing device 260 over the network 210. As used herein, the computing device 202 includes, without limitation, a server, a desktop computer, a laptop computer, a mobile computing device, a tablet device, a phone device (a smart phone device), a wearable computing device, a watch device, as well as other types of computing devices. The computing devices 202 also may include a display 209.

As used herein, a wearable computing device includes, without limitation, a watch device (a smart watch device), a ring device, an AR headset, smart eyewear (smart glasses), as well as other types of wearable computing devices. Typically, the wearable computing device includes at least one memory and at least one processor. The wearable computing devices also may include a display device.

Although a single computing device 202 is illustrated, the computing device 202 may be representative of multiple computing devices in communication with one another, such as multiple servers in communication with one another being utilized to perform its various functions over a network.

The at least one processor 206 may represent two or more processors on the computing device 202 executing in parallel and utilizing corresponding instructions stored using the at least one memory 204. The at least one processor 206 may include a graphics processing unit (GPU) and/or a central processing unit (CPU). The at least one memory 204 represents a non-transitory computer-readable storage medium. Of course, similarly, the at least one memory 204 may represent one or more different types of memory utilized by the computing device 202. In addition to storing instructions, which allow the at least one processor 206 to implement the application 208 and its various components, the at least one memory 204 may be used to store data, such as instructions used to decode a code or a portion of a code.

The network 210 may be implemented as the Internet, but may assume other different configurations. For example, the network 210 may include a wide area network (WAN), a local area network (LAN), a wireless network, an intranet, combinations of these networks, and other networks. Of course, although the network 210 is illustrated as a single network, the network 210 may be implemented as including multiple different networks.

The computing device 202 also includes one or more sensors 212. The sensors 212 may include a camera 214 that may be used to assist detecting a code or a code portion, such as the codes and code portions of FIGS. 1A-1F.

The application 208 may be an application 208 that is configured to detect and recognize a code or a code portion such as the codes and code portions of FIGS. 1A-1F. The application 208 includes a detector 216 and a recognizer 218. The detector 216 is configured to use the sensor 212, such as the camera 214 or other sensor, to detect the presence of a first portion of a code. For example, the detector 216 may use the camera 214 or other sensor to detect the presence of the first portion 102a-d of code 100 of FIG. 1A. In this manner, the detector 216 may simply take a first pass at recognizing whether or not what is being sensed or detected is a code. In some instances, position detection markers on the code, such as the position detection markers 116a-116c of FIG. 1B or the position detection markers 126a-126c of FIG. 1C, aid the detector 216 in detecting the presence of the code or detect the presence of at least the first portion of the code.

The method of detecting a symbol by the detector 216 to trigger the recognizer 218 may vary by the first portion of the code. As discussed above, in some implementations, the detector 216 may be programmed to look for the first code portion patterns of FIGS. 1A-1F. The detector 216 may be programmed to look for more than one different type of first portion of the code.

In some implementations, the first portion of the code may be a symbol such as, for instance, a six pointed star. The detector 216 may look for solid shapes with six equidistant sharp angular edges, which is something otherwise rarely seen in the world. It is understood that other symbols may be used. In some implementations, the detector 216 may recognize an uncommon pattern, visual texture, refraction of infrared light, or other signals that occur infrequently enough to minimize false triggering. In the rare event where the detector 216 triggers incorrectly, the recognizer 218 may fail to identify a readable code and the "false positive" would be invisible to a user.

In some implementations, the first portion may function as a single universal first portion that would work with a range of different code types, such as a range of different second portions. The first portion may include a predictably transformable attribute. In this example, the detector 216 may function as a universal detector. For example, the same universal first portion could be detected and read by a universal detector, where the universal first portion has a transformable attribute. For instance, the same universal decoder could work to read a set of dots going around the perimeter, where the perimeter could have a varying degree of roundness (e.g., from a hard cornered square to a perfect circle) to provide distinctions to the code by transformable attribute.

In some implementations, such as in the case when the computing device 202 is a wearable computing device like smart eyewear, the detector 216 in combination with the sensor 212 may use a low power state to detect the presence of the first portion of the code. In this manner detection of the code may occur even if other components of the computing device 202 may be in a lower or off power state.

Once the detector 216 detects the presence of the first portion of the code, the recognizer 218 attempts to decode the first portion of the code. That is, the recognizer 218 attempts to recognize the identifier in the first portion of the code. In some implementations, the recognizer 218 includes a machine learning module 219 to perform the recognition task. The machine learning module 219 may be trained using one or more machine learning training techniques to decode the first portion of the code and output the identifier. For example, a sensor may capture an image, have the image pre-processed to normalize contrast and brightness effects, extract features using Histogram of Oriented Gradients (HOG), Scale-Invariant Feature Transform (SIFT), or Speeded Up Robust Feature (SURF), an then compare those features against trained, semi-trained, or untrained data sets using classification algorithms.

Part of the recognition process is to determine where the identifier points to so that the computing device may obtain instructions for decoding the non-decodable portion of the code. As discussed above with respect to the example codes and code portions of FIGS. 1A-1F, the identifier points to a source that provides instructions on how to decode the rest of the code. In some implementations, the identifier may direct the computing device to obtain instructions 255 from a remote computing device 250. That is, the identifier may be an Internet address or other address or other means of identifying the remote computing device 250 as the source for the instructions 255. For example, the identifier may point to an application repository (e.g., an app store) and refer to a specific application developer identifier and a manifest file for the application developer, which contains instructions 255 for decoding the rest of the code.

In some implementations, the recognizer 218 may transmit the identifier to the remote computing device 250 identified as the source for obtaining the instructions. The remote computing device 250 may use the identifier or part of the identifier to aid in obtaining the instructions to send back to the recognizer 218. The recognizer 218 receives the instructions from the remote computing device 260 over the network 210 based on the identifier.

In some implementations, the identifier may direct the computing device 202 to obtain instructions locally from a memory 204 on the computing device 202. That is, the identifier may point to the local cache in the memory 204 as the source for containing the instructions to decode the second portion of the code. In some implementations, the identifier may direct the computing device 202 to first check the memory 204 on the computing device 202 and, if the instructions are not found in the memory 204, then to obtain the instructions 255 from the remote computing device 250.

After obtaining the instructions from the source identified by the identifier, the recognizer 218 processes the instructions to decode the second portion of the code to generate a decoded second portion of the code. The processor 206 performs an action defined in the decoded second part of the code. For example, in some implementations, the action defined in the defined in the decoded part of the code is an action performed by the computing device. The action can be any type of action including, for instance, playing a song, navigating a browser to a web site, launching an installed application, launching the application store application, or any action defined in the part of the code, as interpreted by the instructions. The actions that may be performed are varying and unlimited.

In some implementations, the action performed may cause the computing device 202 to trigger an action on a connected computing device (not shown) such as a wearable computing device, including an AR headset (e.g., smart eyewear). In some implementations, the computing device 202 may be a wearable computing device, including an AR headset (e.g., smart eyewear) and the action performed may cause the wearable computing device to cause an action to a connected computing device (not shown), such as a mobile smart phone. For instance, the action performed may be for the wearable computing device to cause a song to play on the connected computing device, such as the mobile smart phone.

In some implementations, the recognizer 218 may transmit the identifier to the remote computing device 250. The remote computing device 250 may communicate the instructions to another remote computing device 260. The remote computing device 260 may process the instructions to decode the second portion of the code to generate a decoded second portion of the code. The remote computing device 260 communicates the decoded second portion of the code to the recognizer 218 over the network 210. The recognizer 218 receives the decoded second portion of the code from the remote computing device 260. The processor 206 performs the action defined by the decoded second portion of the code. In this manner, the instructions and the use of the instructions to decode the second portion of the code may be kept secret from the computing device 202.

Figure 3:
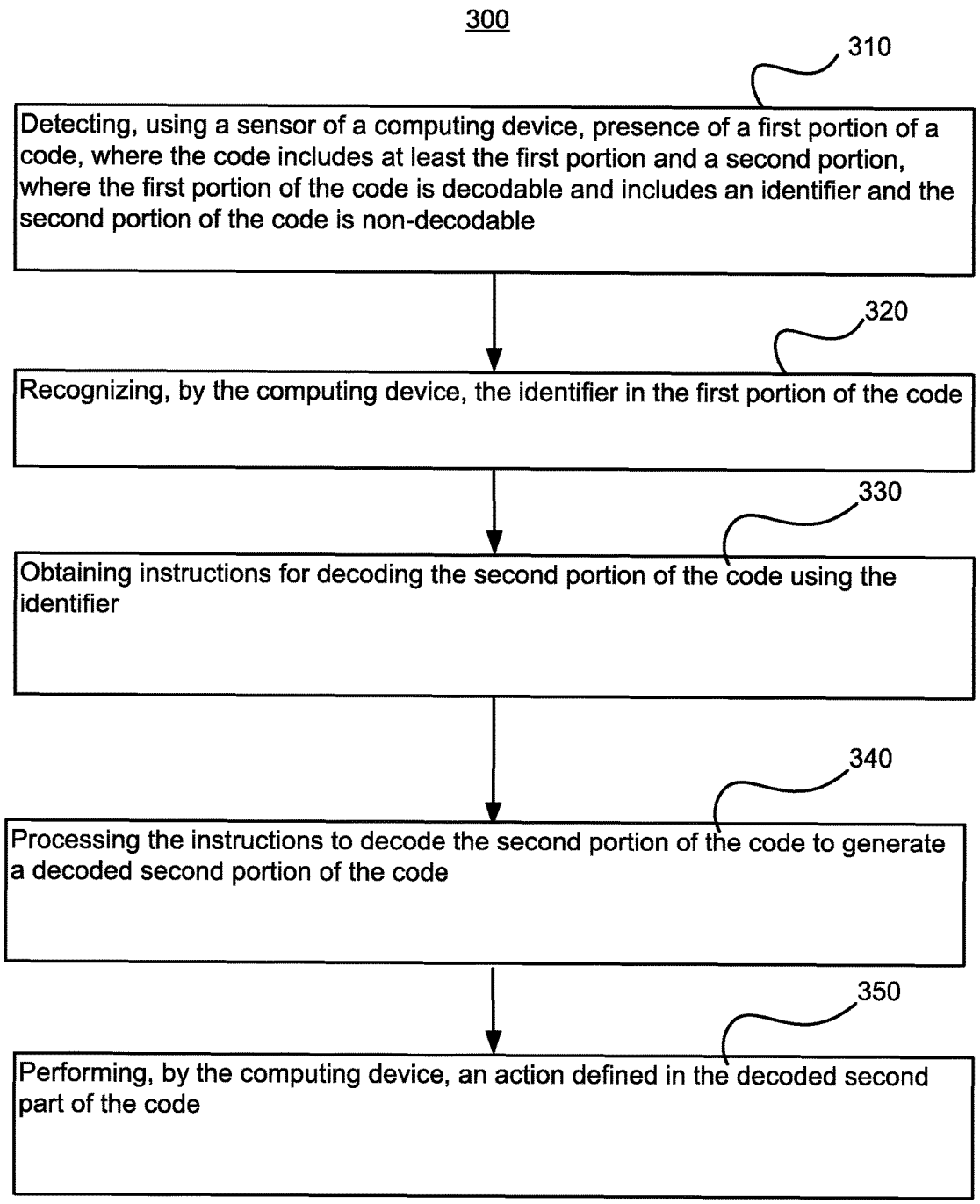
FIG. 3 is a flowchart illustrating example operations of the system of FIG. 1.

Referring to FIG. 3, an example process 300 illustrates example operations of the system 200 of FIG. 2. More specifically, process 300 illustrates an example of a computer-implemented method to detect and recognize a code. Instructions for the performance of process 300 may be stored in the at least one memory 204 and executed by the at least one processor 206 on the computing device 202. The instructions for the performance of process 300 may cause the at least one processor 206 to implement the application 208 and its components.

Process 300 includes detecting, using a sensor of a computing device, presence of a first portion of a code, where the code includes at least the first portion and a second portion. The first portion of the code is decodable and includes an identifier and the second portion of the code is non-decodable (310). For example, with respect to FIG. 2, the detector 216 is configured to detect the presence of a first portion of a code, such as the first portion 102a-102d of the code 100 of FIG. 1. The first portion 102a-d is decodable and includes an identifier and the second portion of the code 104 is non-decodable meaning that the application 208 and the computing device 202 are not capable of decoding the second portion of the code 104 without first obtaining additional instructions using the identifier.

In some implementations, detecting the presence of the first portion of the code includes detecting the presence of the first portion of the code using a camera of a wearable computing device. For example, the wearable computing device may be smart eyewear, which also may be used as an AR headset.

Process 300 includes recognizing, by the computing device, the identifier in the first portion of the code (320). For example, with respect to FIG. 2, the recognizer 218 is configured to recognize the identifier in the first portion of the code. In some implementations, the recognizer 218 may use a machine learning module 219 to recognize the identifier in the first portion of the code.

Process 300 includes obtaining instructions for decoding the second portion of the code using the identifier (330). For example, with respect to FIG. 2, the recognizer is configured to obtain instructions for decoding the second portion of the code using the identifier. As discussed above, the identifier may identify the source that stores the instructions. In some implementations, the source identified by the identifier is a remote computing device in which case the recognizer 218 obtains the instructions from the remote computing device such as obtaining the instructions 255 from the remote computing device 250. In some implementations, the source identified by the identifier is the computing device, in which case the recognizer 218 obtains the instructions from the memory 204 in the computing device 202. Obtaining the instructions may include transmitting the identifier and/or other portions of the code to the remote computing device and receiving the instructions from the remote computing device.

Process 300 includes processing the instructions to decode the second portion of the code to generate a decoded second portion of the code (340). For example, with respect to FIG. 2, the recognizer 218 processes the instructions to decode the second portion of the code to generate a decoded second portion of the code.

In some implementations, the processing of the instructions may be performed by a remote computing device such as remote computing device 250, which stored the instructions 255, or remote computing device 260. In either case, the decoded second portion of the code would be transmitted to the computing device 202 and the computing device 202 would receive the decoded second portion of the code.

Process 300 includes performing, by the computing device, an action defined in the decoded second portion of the code (350). For example, with respect to FIG. 2, the processor 206 may perform or cause the computing device 202 to perform the action defined in the decoded second portion of the code.

Figure 4:
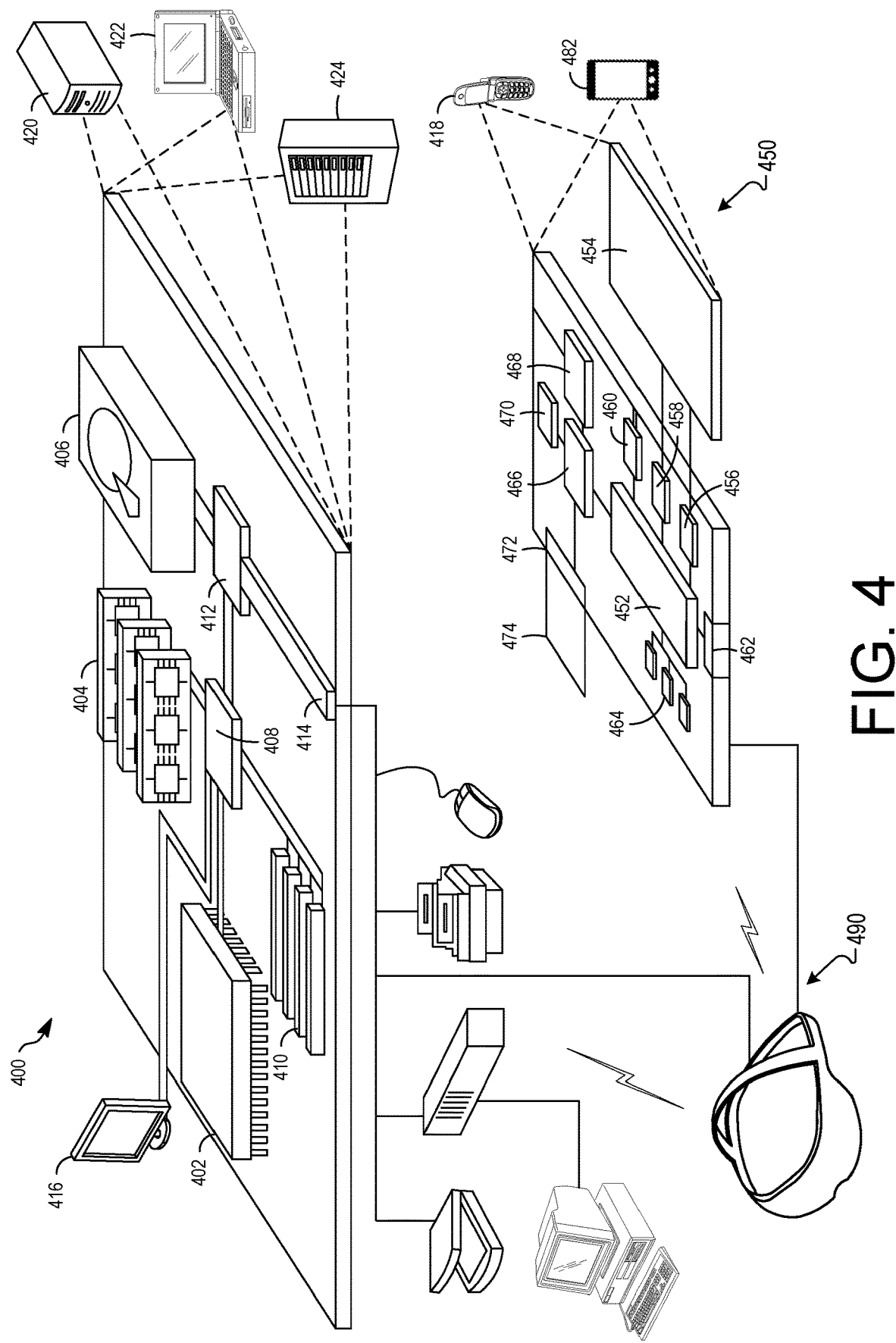
FIG. 4 shows an example of a computer device and a mobile computer device that can be used to implement the techniques described here.

FIG. 4 shows an example of a computer device and a mobile computer device that can be used to implement the techniques described here. FIG. 4 shows an example of a generic computer device 400 and a generic mobile computer device 450, which may be used with the techniques described here. Computing device 400 is intended to represent various forms of digital computers, such as laptops, desktops, tablets, workstations, personal digital assistants, televisions, servers, blade servers, mainframes, and other appropriate computing devices. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. The processor 402 can be a semiconductor-based processor. The memory 404 can be a semiconductor-based memory. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 418. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 4 can include sensors that interface with a virtual reality (VR headset 490). For example, one or more sensors included on a computing device 450 or other computing device depicted in FIG. 4, can provide input to VR headset 490 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 450 can use the sensors to determine an absolute position and/or a detected rotation of the computing device in the VR space that can then be used as input to the VR space. For example, the computing device 450 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 450 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 450 when the computing device is incorporated into the VR space can cause a particular action to occur in the VR space.

In some implementations, a touchscreen of the computing device 450 can be rendered as a touchpad in VR space. A user can interact with the touchscreen of the computing device 450. The interactions are rendered, in VR headset 490 for example, as movements on the rendered touchpad in the VR space. The rendered movements can control objects in the VR space.

In some implementations, one or more output devices included on the computing device 450 can provide output and/or feedback to a user of the VR headset 490 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 450 may appear as another object in a computer-generated, 3D environment. Interactions by the user with the computing device 450 (e.g., rotating, shaking, touching a touchscreen, swiping a finger across a touch screen) can be interpreted as interactions with the object in the VR space. In the example of the laser pointer in a VR space, the computing device 450 appears as a virtual laser pointer in the computer-generated, 3D environment. As the user manipulates the computing device 450, the user in the VR space sees movement of the laser pointer. The user receives feedback from interactions with the computing device 450 in the VR space on the computing device 450 or on the VR headset 490.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

In the following some examples are described.

Example 1: A computer-implemented method comprising:
- detecting, using a sensor of a computing device, presence of a first portion of a code, the code comprising at least the first portion and a second portion, wherein the first portion of the code is decodable and comprises an identifier and the second portion of the code is non-decodable;
- recognizing, by the computing device, the identifier in the first portion of the code;
- obtaining instructions for decoding the second portion of the code using the identifier and/or data associated with the identifier;
- processing the instructions to decode the second portion of the code to generate a decoded second portion of the code; and
- performing, by the computing device, an action defined in the decoded second portion of the code.

Example 2: The computer-implemented method as in example 1, wherein the code is a two-dimensional (2D) image with the first portion of the code defining an outer portion of the 2D image and the second portion of the code defining an inner portion of the 2D image.

Example 3: The computer-implemented method as in example 1, wherein the code is a 2D image with the first portion of the code defining an inner portion of the 2D image and the second portion of the code defining an outer portion of the 2D image.

Example 4: The computer-implemented method as in any of the preceding examples, wherein the code comprises graphical characteristics differing in position, size, color, shape and/or fill.

Example 5: The computer-implemented method as any of the preceding examples, wherein the first portion of the code is universally decodable, in particular without the instructions to decode the second portion of the code and the second portion of the code is only decodable with the instructions.

Example 6: The computer-implemented method as in any of the preceding examples, wherein the detecting, using the sensor of the computing device, the presence of the first portion of the code comprises detecting, using a camera of a wearable computing device, the presence of the first portion of the code.

Example 7: The computer-implemented method as in example 6, wherein the wearable computing device includes smart eyewear.

Example 8: The computer-implemented method as in any of the preceding examples, wherein recognizing, by the computing device, the identifier in the first portion of the code comprises recognizing, using a machine learning module on the computing device, the identifier in the first portion of the code.

Example 9: The computer-implemented method as in any of the preceding examples, wherein obtaining the instructions for decoding the second portion of the code using the identifier comprises:
- transmitting the identifier to a remote computing device identified by the identifier over a network; and
- receiving the instructions from the remote computing device over the network based on the identifier.

Example 10: The computer-implemented method as in any of the preceding examples, wherein obtaining the instructions for decoding the second portion of the code using the identifier comprises retrieving the instructions from a memory on the computing device.

Example 11: The computer-implemented method as any of the preceding examples, wherein:
- obtaining the instructions for decoding the second portion of the code using the identifier comprises transmitting the identifier to a first remote computing device identified by the identifier over a network; and
- processing the instructions to decode the second portion of the code comprises receiving the decoded second portion of the code from a second remote computing device, the second remote computing device different than the first remote computing device.

Example 12: A computer program product tangibly embodied in a non-transitory storage medium, the computer program product including instructions that when executed by a processor cause the processor to perform operations, the operations comprising:
- detecting, using a sensor of a computing device, presence of a first portion of a code, the code comprising at least the first portion and a second portion, wherein the first portion of the code is decodable and comprises an identifier and the second portion of the code is non-decodable;
- recognizing, by the computing device, the identifier in the first portion of the code;
- obtaining instructions for decoding the second portion of the code using the identifier and/or data associated with the identifier;
- processing the instructions to decode the second portion of the code to generate a decoded second portion of the code; and
- performing, by the computing device, an action defined in the decoded second portion of the code.

Example 13: The computer program product of example 12, wherein the code is a two-dimensional (2D) image with the first portion of the code defining an outer portion of the 2D image and the second portion of the code defining an inner portion of the 2D image.

Example 14: The computer program product of example 12, wherein the code is a 2D image with the first portion of the code defining an inner portion of the 2D image and the second portion of the code defining an outer portion of the 2D image.

Example 15: The computer program product as in any of the examples 12 to 14, wherein the code comprises graphical characteristics differing in position, size, color, shape and/or fill.

Example 16: The computer program product of any of the examples 12 to 15, wherein the first portion of the code is universally decodable, in particular without the instructions to decode the second portion of the code and the second portion of the code is only decodable with the instructions.

Example 17: The computer program product of any of the examples 12 to 16, wherein the detecting, using the sensor of the computing device, the presence of the first portion of the code comprises detecting, using a camera of a wearable computing device, the presence of the first portion of the code.

Example 18: The computer program product of example 17, wherein the wearable computing device includes smart eyewear.

Example 19: The computer program product of any of the examples 12 to 18, wherein recognizing, by the computing device, the identifier in the first portion of the code comprises recognizing, using a machine learning module on the computing device, the identifier in the first portion of the code.

Example 20: The computer program product of any of the examples 12 to 19, wherein obtaining the instructions for decoding the second portion of the code using the identifier comprises:
  transmitting the identifier to a remote computing device identified by the identifier over a network; and
  receiving the instructions from the remote computing device over the network based on the identifier.

Example 21: The computer program product of any of the examples 12 to 20, wherein obtaining the instructions for decoding the second portion of the code using the identifier comprises retrieving the instructions from a memory on the computing device.

Example 22: The computer program product of any of the examples 12 to 21, wherein:
  obtaining the instructions for decoding the second portion of the code using the identifier comprises transmitting the identifier to a first remote computing device identified by the identifier over a network; and
  processing the instructions to decode the second portion of the code comprises receiving the decoded second portion of the code from a second remote computing device, the second remote computing device different than the first remote computing device.

Example 23: A computing device, comprising:
  a sensor;
  a non-transitory computer readable storage medium comprising instructions; and
  at least one processor that is operably coupled to the non-transitory computer-readable storage medium and that is arranged and configured to execute the instructions that, when executed, cause the at least one processor to implement an application, the application comprising:
    a detector that is configured to use the sensor to detect presence of a first portion of a code, the code comprising at least the first portion and a second portion, wherein the first portion of the code is decodable and comprises an identifier and the second portion of the code is non-decodable; and
    a recognizer that is configured to:
      recognize the identifier in the first portion of the code,
      obtain instructions for decoding the second portion of the code using the identifier and/or data associated with the identifier and
      process the instructions to decode the second portion of the code to generate a decoded second portion of the code, wherein
    the at least one processor performs an action defined in the decoded second portion of the code.

Example 24: The computing device of example 23, wherein the code is a two-dimensional (2D) image with the first portion of the code defining an outer portion of the 2D image and the second portion of the code defining an inner portion of the 2D image.

Example 25: The computing device of example 23, wherein the code is a 2D image with the first portion of the code defining an inner portion of the 2D image and the second portion of the code defining an outer portion of the 2D image.

Example 26: The computing device as in any of the examples 23 to 25 wherein the code comprises graphical characteristics differing in position, size, color, shape and/or fill.

Example 27: The computing device of any of the examples 23 to 26, wherein the first portion of the code is universally decodable, in particular without the instructions to decode the second portion of the code and the second portion of the code is only decodable with the instructions.

Example 28: The computing device of any of the examples 23 to 27, wherein:
  the computing device is a wearable computing device;
  the senor includes a camera; and
  the detector is configured to use the camera to detect the presence of the first portion of the code.

Example 29: The computing device of example 25, wherein the wearable computing device includes smart eyewear.

Example 30: The computing device of any of the examples 23 to 29, wherein the recognizer includes a machine learning module that is configured to recognize the identifier in the first portion of the code.

Example 31: The computing device of any of the examples 23 to 30, wherein the recognizer is configured to obtain the instructions for decoding the second portion of the code using the identifier by:
  transmitting the identifier to a remote computing device identified by the identifier over a network; and
  receiving the instructions from the remote computing device over the network based on the identifier.

Example 32: The computing device of any of the examples 23 to 31, wherein the recognizer is configured to obtain the instructions for decoding the second portion of the code using the identifier by retrieving the instructions from the non-transitory computer-readable storage medium.

Example 33: A computing device, comprising:
  a sensor;
  a non-transitory computer readable storage medium comprising instructions; and
  at least one processor that is operably coupled to the non-transitory computer-readable storage medium and that is arranged and configured to execute the instructions that, when executed, cause the at least one processor to implement an application, the application comprising:
a detector that is configured to:
use the sensor to detect presence of a first portion of a code, the code comprising at least the first portion and a second portion, and
in response to detecting the presence of the first portion of the code, trigger a recognizer to wake up; and
the recognizer that is configured to:
use a set of recognizers to decode the second portion of the code, and process the instructions to decode the second portion of the code to
generate a decoded second portion of the code, wherein the at least one processor performs an action defined in the decoded second portion of the code.

What is claimed is:

1. A computer-implemented method comprising:
detecting, using a camera of an augmented reality (AR) headset, presence of a first portion of a code, the code comprising at least the first portion and a second portion, wherein the first portion of the code is decodable and comprises an identifier and the second portion of the code is decodable using instructions;
recognizing, by the AR headset, the identifier in the first portion of the code;
obtaining the instructions for decoding the second portion of the code using the identifier or data associated with the identifier;
processing the instructions to decode the second portion of the code to generate a decoded second portion of the code using a module to predict the decoded second portion of the code; and
performing, by the AR headset, an action defined in the decoded second portion of the code to launch an application in the AR headset.

2. The computer-implemented method as in claim 1, wherein the code is a two-dimensional (2D) image with the first portion of the code defining an outer portion of the 2D image and the second portion of the code defining an inner portion of the 2D image.

3. The computer-implemented method as in claim 1, wherein the code is a 2D image with the first portion of the code defining an inner portion of the 2D image and the second portion of the code defining an outer portion of the 2D image.

4. The computer-implemented method as in claim 1, wherein the code comprises graphical characteristics differing in position, size, color, shape, or fill.

5. The computer-implemented method as in claim 1, wherein the first portion of the code is universally decodable, in particular without the instructions to decode the second portion of the code and the second portion of the code is only decodable with the instructions.

6. The computer-implemented method as in claim 1, wherein the AR headset includes smart eyewear.

7. The computer-implemented method as in claim 1, wherein recognizing, by the AR headset, the identifier in the first portion of the code comprises recognizing, using the module on the AR headset, the identifier in the first portion of the code.

8. The computer-implemented method as in claim 1, wherein obtaining the instructions for decoding the second portion of the code using the identifier comprises:
transmitting the identifier to a remote computing device identified by the identifier over a network; and
receiving the instructions from the remote computing device over the network based on the identifier.

9. The computer-implemented method as in claim 1, wherein obtaining the instructions for decoding the second portion of the code using the identifier comprises retrieving the instructions from a memory on the AR headset.

10. The computer-implemented method as in claim 1, wherein:
obtaining the instructions for decoding the second portion of the code using the identifier comprises transmitting the identifier to a first remote computing device identified by the identifier over a network; and
processing the instructions to decode the second portion of the code comprises receiving the decoded second portion of the code from a second remote computing device, the second remote computing device different than the first remote computing device.

11. A computer program product tangibly embodied in a non-transitory storage medium, the computer program product including instructions that when executed by a processor cause the processor to perform operations, the operations comprising:
detecting, using a camera of an augmented reality (AR) headset, presence of a first portion of a code, the code comprising at least the first portion and a second portion, wherein the first portion of the code is decodable and comprises an identifier and the second portion of the code is decodable using instructions;
recognizing, by the AR headset, the identifier in the first portion of the code;
obtaining the instructions for decoding the second portion of the code using the identifier or data associated with the identifier;
processing the instructions to decode the second portion of the code to generate a decoded second portion of the code using a module to predict the decoded second portion of the code; and
performing, by the AR headset, an action defined in the decoded second portion of the code to launch an application in the AR headset.

12. The computer program product of claim 11, wherein the code is a two-dimensional (2D) image with the first portion of the code defining an outer portion of the 2D image and the second portion of the code defining an inner portion of the 2D image.

13. The computer program product of claim 11, wherein the code is a 2D image with the first portion of the code defining an inner portion of the 2D image and the second portion of the code defining an outer portion of the 2D image.

14. The computer program product as in claim 11, wherein the code comprises graphical characteristics differing in position, size, color, shape, or fill.

15. The computer program product of claim 11, wherein the first portion of the code is universally decodable, in particular without the instructions to decode the second portion of the code and the second portion of the code is only decodable with the instructions.

16. The computer program product of claim 11, wherein the AR headset includes smart eyewear.

17. The computer program product of claim 11, wherein recognizing, by the AR headset, the identifier in the first portion of the code comprises recognizing, using the module on the AR headset, the identifier in the first portion of the code.

18. The computer program product of claim 11, wherein obtaining the instructions for decoding the second portion of the code using the identifier comprises:
- transmitting the identifier to a remote computing device identified by the identifier over a network; and
- receiving the instructions from the remote computing device over the network based on the identifier.

19. The computer program product of claim 11, wherein obtaining the instructions for decoding the second portion of the code using the identifier comprises retrieving the instructions from a memory on the AR headset.

20. The computer program product of claim 11, wherein:
- obtaining the instructions for decoding the second portion of the code using the identifier comprises transmitting the identifier to a first remote computing device identified by the identifier over a network; and
- processing the instructions to decode the second portion of the code comprises receiving the decoded second portion of the code from a second remote computing device, the second remote computing device different than the first remote computing device.

21. A computing device, comprising:
- an augmented reality (AR) headset;
- a sensor;
- a non-transitory computer-readable storage medium comprising instructions; and
- at least one processor disposed in the AR headset that is operably coupled to the non-transitory computer-readable storage medium and that is arranged and configured to execute the instructions that, when executed, cause the at least one processor to implement an application, the application comprising:
  - a detector that is configured to use the sensor to detect presence of a first portion of a code, the code comprising at least the first portion and a second portion, wherein the first portion of the code is decodable and comprises an identifier and the second portion of the code is decodable using instructions; and
  - a recognizer that is configured to:
    - recognize the identifier in the first portion of the code,
    - obtain the instructions for decoding the second portion of the code using the identifier or data associated with the identifier and process the instructions to decode the second portion of the code to generate a decoded second portion of the code using a module to predict the decoded second portion of the code, wherein
  - the at least one processor performs an action defined in the decoded second portion of the code to launch an application in the AR headset.

22. The computing device of claim 21, wherein the code is a two-dimensional (2D) image with the first portion of the code defining an outer portion of the 2D image and the second portion of the code defining an inner portion of the 2D image.

23. The computing device of claim 21, wherein the code is a 2D image with the first portion of the code defining an inner portion of the 2D image and the second portion of the code defining an outer portion of the 2D image.

24. The computing device as in claim 21, wherein the code comprises graphical characteristics differing in position, size, color, shape, or fill.

25. The computing device of claim 21, wherein the first portion of the code is universally decodable, in particular without the instructions to decode the second portion of the code and the second portion of the code is only decodable with the instructions.

26. The computing device of claim 21, wherein the AR headset includes smart eyewear.

27. The computing device of claim 21, wherein the recognizer includes the module that is configured to recognize the identifier in the first portion of the code.

28. The computing device of claim 21, wherein the recognizer is configured to obtain the instructions for decoding the second portion of the code using the identifier by:
- transmitting the identifier to a remote computing device identified by the identifier over a network; and
- receiving the instructions from the remote computing device over the network based on the identifier.

29. The computing device of claim 21, wherein the recognizer is configured to obtain the instructions for decoding the second portion of the code using the identifier by retrieving the instructions from the non-transitory computer-readable storage medium.

* * * * *